(12) United States Patent
Hebert et al.

(10) Patent No.: US 11,425,166 B2
(45) Date of Patent: Aug. 23, 2022

(54) IDENTIFIER-BASED APPLICATION SECURITY

(71) Applicant: SAP SE, Walldorf (DE)

(72) Inventors: Cedric Hebert, Mougins (FR); Merve Sahin, Antibes (FR); Anderson Santana de Oliveira, Antibes (FR)

(73) Assignee: SAP SE, Walldorf (DE)

( * ) Notice: Subject to any disclaimer, the term of this patent is extended or adjusted under 35 U.S.C. 154(b) by 395 days.

(21) Appl. No.: 16/552,951

(22) Filed: Aug. 27, 2019

(65) Prior Publication Data

US 2021/0067551 A1 Mar. 4, 2021

(51) Int. Cl.
*H04L 9/40* (2022.01)
*H04L 67/146* (2022.01)
*H04L 29/06* (2006.01)

(52) U.S. Cl.
CPC ...... *H04L 63/1491* (2013.01); *H04L 63/0861* (2013.01); *H04L 63/102* (2013.01); *H04L 63/105* (2013.01); *H04L 67/146* (2013.01)

(58) Field of Classification Search
CPC ............. H04L 63/1491; H04L 63/0861; H04L 63/102; H04L 63/105; H04L 63/14; H04L 63/1441; H04L 63/1483; H04L 63/20; H04L 67/146
See application file for complete search history.

(56) References Cited

U.S. PATENT DOCUMENTS

| | | |
|---|---|---|
| 2008/0256172 A1 | 10/2008 | Hebert et al. |
| 2009/0077376 A1 | 3/2009 | Montagut et al. |
| 2009/0222399 A1 | 9/2009 | Gomez et al. |
| 2009/0327317 A1 | 12/2009 | Ulmer et al. |
| 2012/0042364 A1* | 2/2012 | Hebert ................. G06F 21/554 726/6 |
| 2013/0160079 A1 | 6/2013 | Hebert |
| 2013/0262397 A1 | 10/2013 | Hebert |
| 2014/0372927 A1 | 12/2014 | Hebert et al. |
| 2015/0013006 A1* | 1/2015 | Shulman ............ H04L 63/1416 726/23 |
| 2015/0033346 A1 | 1/2015 | Hebert et al. |
| 2016/0078234 A1 | 3/2016 | Li et al. |

(Continued)

OTHER PUBLICATIONS

Sanchez-Rola et al., "Clock Around the Clock: Time-Based Device Fingerprinting", Oct. 2018, ACM SIGSAC Conference, 13 pgs.

(Continued)

*Primary Examiner* — Edward Zee
(74) *Attorney, Agent, or Firm* — Klarquist Sparkman, LLP

(57) ABSTRACT

Systems, methods, and computer media for securing software applications are provided herein. Through the use of an identifier such as a digital fingerprint, application sessions or session requests that use the same credentials can be distinguished, and malicious users can be detected and managed. A request to establish a session with an application can be received. Based on a digital fingerprint associated with the request, it can be determined that although a credential included in the request is valid, the request is unauthorized by comparing the digital fingerprint to known malicious fingerprints. When the fingerprint is found to be malicious, a cloned application session having at least partially fake data can be established instead of the requested application, thus limiting an attacker's access to real application data without revealing to the attacker that the attack has been detected.

19 Claims, 11 Drawing Sheets

(56) References Cited

U.S. PATENT DOCUMENTS

| | | |
|---|---|---|
| 2016/0099953 A1 | 4/2016 | Hebert et al. |
| 2016/0112376 A1 | 4/2016 | Gomez et al. |
| 2017/0019421 A1 | 1/2017 | Hebert et al. |
| 2017/0169217 A1 | 6/2017 | Rahaman et al. |
| 2017/0177308 A1 | 6/2017 | Montagnon et al. |
| 2017/0177310 A1 | 6/2017 | Mathias et al. |
| 2017/0270294 A1* | 9/2017 | Touboul .................. G06F 21/56 |
| 2018/0004978 A1 | 1/2018 | Hebert et al. |
| 2018/0041546 A1 | 2/2018 | Gomez et al. |
| 2018/0077174 A1 | 3/2018 | Hebert |
| 2019/0068641 A1 | 2/2019 | Araujo et al. |

OTHER PUBLICATIONS

"Observations From the Front Lines of Threat Hunting: A 2018 Mid-Year Review From Falcon OverWatch", https://go.crowdstrike.com/rs/281-OBQ-/266/images/Report2018OverwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.prnewswire.com/news-releases/the-rasp-market-size-is-expected-to-grow-from-usd-2947-million-in-2017-to-usd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 2019, 38 pgs.

* cited by examiner

IDENTIFIER-BASED APPLICATION SECURITY

BACKGROUND

As reliance on the Internet and software applications has continued to grow, cyber security has also gained in importance. Securing computer systems and applications against attackers employing varying malicious techniques has become a difficult task. In addition to exploiting software bugs and vulnerabilities, some attackers obtain valid credentials for authorized users and use these credentials to gain unauthorized access to applications or computer systems. Detecting and managing such unauthorized access is challenging.

DETAILED DESCRIPTION

Figure 1:
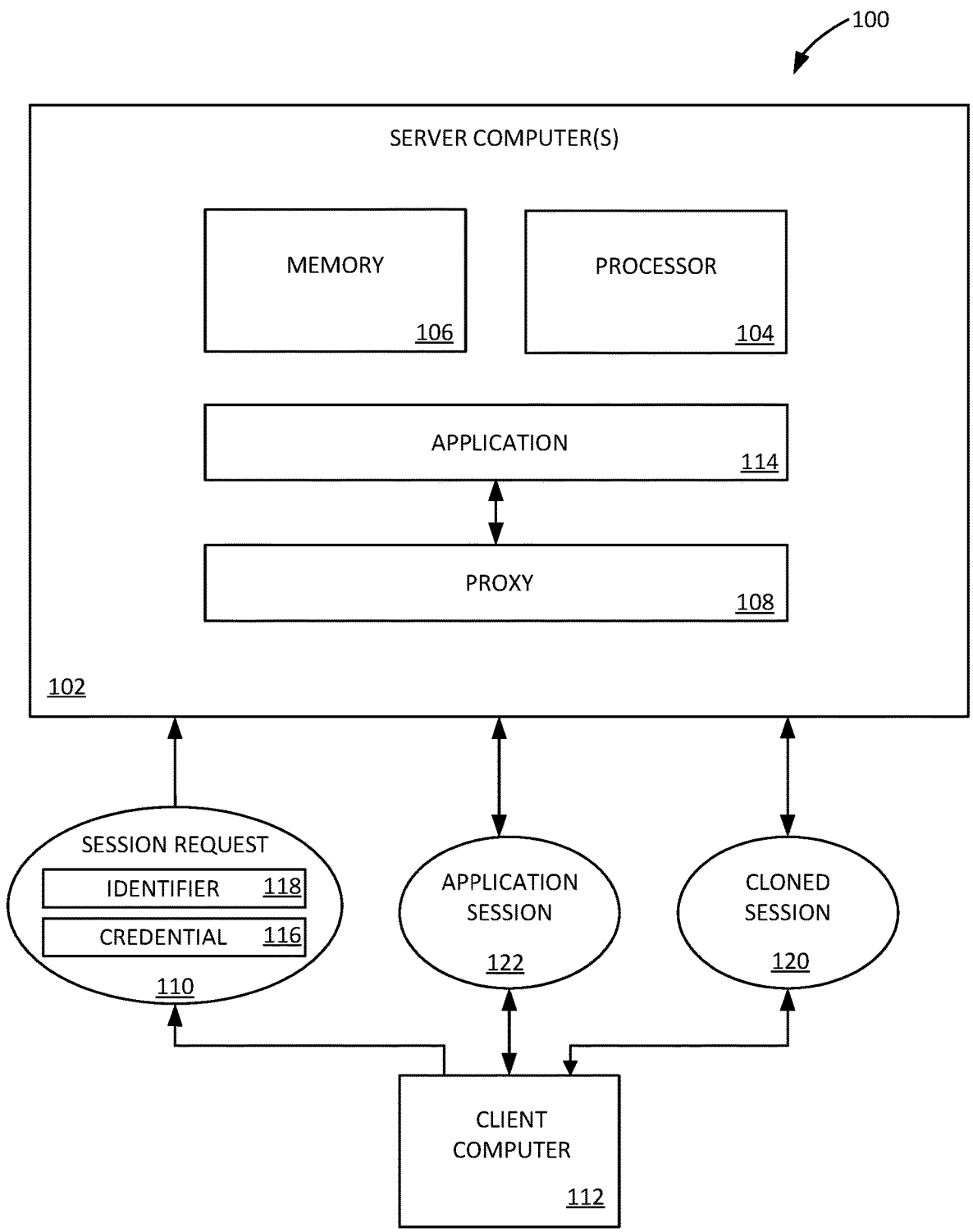
FIG. 1 is an example identifier-based application security system.

The examples described herein generally secure software applications against unauthorized access. Through the use of an identifier, the described examples allow detection and management of unauthorized users interacting with an application. The identifier can be, for example, a digital fingerprint that reflects characteristics of a user or user's computer. Application sessions or session requests that use the same credentials can be distinguished based on the digital fingerprint, allowing the different sessions or session requests to be handled differently for security reasons.

As an example, during an application session, activity can indicate that the session is likely to be malicious even when valid account credentials have been provided. A user might, for example, look for hidden functions, attempt to modify a session cookie to become an administrator, or take other actions that are unusual for a typical user, indicating a possibly malicious or unauthorized session. A digital fingerprint can be determined for the user, and appropriate action can be taken to limit further access and secure the application against future incursions by that user. For example, the user can be transferred to a cloned application session that includes fabricated data to stop the present incursion, and any future application session requests for which that user's digital fingerprint is detected can also result in a cloned session being established rather than an application session. Application session requests using the same credentials but that are not associated with the user's digital fingerprint (which can be, for example, a request from an authorized user associated with the credentials) can be treated differently.

For example, application session requests associated with the credentials used to establish the malicious session but that are not associated with the malicious user's digital fingerprint can be treated as non-malicious, and an application session can be established. In some examples, rather than establishing a session, a non-malicious user is notified that the account is locked. In this way, the malicious user, by being sent to a cloned session, is unaware that his or her malicious activity has been detected, but the non-malicious user is alerted that the account credentials have been compromised because the account is locked. The non-malicious user can then change the credentials preventing any other user who may have obtained the credentials from accessing the account. If an attacker is aware that certain actions alerted the application to malicious activity, the attacker can change tactics or attempt to evade detection. By continuing to direct the malicious user to a cloned session with fabricated data, however, the attacker can be monitored without the attacker gaining access to more real data.

In some examples, digital fingerprints for users are associated with a reputation score or other metric that can be increased or decreased based on various factors such as the types of activities the user engages in during application sessions, how frequently application sessions are established, etc. When multiple users have established application sessions at the same time using the same credentials and malicious activity is detected, the malicious user can be directed to a cloned session and the user with, for example, the highest reputation score among the remaining users can be assumed to be an authorized user and that application session can be maintained. In some examples, the session for a user with the highest reputation score can be terminated or locked to notify the user that account credentials have been compromised, and remaining sessions are transferred to cloned sessions.

The described identifier-based approaches to securing an application keep data and applications secure from malicious activity while at the same time keeping attackers from discovering that they have been identified. The identifier-based approaches also allow different sessions or sessions requests using the same credentials to be managed differently according to security risk. Examples are described below with reference to FIGS. 1-11.

FIG. 1 illustrates an identifier-based application security system 100. System 100 can be implemented using server computer(s) 102. Server computer(s) 102 can be, for example, one or more centralized server computers, distributed computers, or a cloud computing system. Server computer(s) 102 include a processor 104 and a memory 106 coupled to processor 104.

A proxy 108 is configured to receive a request 110 from client computer 112 to establish a session with an application 114. Proxy 108 can be a separate proxy server or proxy functionality implemented on one or more of server computer(s) 102. In some examples, processor 104 and memory 106 are part of proxy 108. Application 114 can be a web application accessed through a browser running on client computer 112 or an application accessible to client computer 112 locally or through a local network. Session requests such as request 110, and sessions can be identified using session cookies or other identifiers. In some examples, request 110 is treated as an established session and assigned a session cookie prior to authentication.

Session request 110 includes at least one credential 116 and an identifier 118. Credential 116 can be, for example, a user name and/or password, a digital certificate, biometric information, single-sign-on token, or other credential. Identifier 118 can be, for example, a digital fingerprint (also known as a browser fingerprint or device fingerprint) that represents client computer 112 or a user associated with client computer 112. Some digital fingerprints (e.g., JS Fingerprint 2 and Web GL) are determined by sending a browser a portion of code (e.g., JavaScript) to run and the result becomes the digital fingerprint. The result of running the code will vary depending on the browser settings, system settings, fonts, plugins, screen resolution, and/or other aspects of client computer 112 that results in a unique identifier representing client computer 112.

Some digital fingerprinting approaches (e.g. Canvas) involve providing an image to a browser for rendering, and the result is sufficiently different from machine to machine that the result can be used as an identifier. Another digital fingerprinting approach that can be used is Crypto FP, where different challenges are provided to the browser, and the differing times the challenges take to complete for each machine is used as the identifier. In some examples, IP address, cookies, or other information is used as identifier 118. In some examples, identifier 118 is determined each time a session request such as session request 110 is made. In other examples, identifier 118 is determined upon authentication. In still other examples identifier 118 was created in a past session and is stored on client computer 112.

Proxy 108 determines, by processor 104, whether credential 116 is valid, and if credential 116 is valid, proxy 108 determines if request 110 is nevertheless an unauthorized request based on identifier 118 that is associated with request 110. Proxy 108 compares identifier 118 to a group of malicious identifiers for which cloned sessions are created rather than application session. If proxy 108 determines that request 110 is an unauthorized request, proxy 108 causes a cloned application session 120 to be created instead of the requested session with application 114. Cloned application session 120 includes at least some alternative data in place of data associated with an application account. In some examples, proxy 108 compares identifier 118 to the group of malicious identifiers before determining whether credential 116 is valid.

If identifier 118 were a malicious identifier and instead of establishing cloned application session 120, session request 110 were simply denied, the attacker who submitted session request 110 would be tipped off that system 100 has recognized them as a malicious user. The malicious user might then find other ways to attack application 114, possibly using other credentials or techniques, that do not cause the user to be flagged as malicious. By providing cloned session 120, the malicious user sees the application interface and thinks they have successfully gained access to application 114, but some or all of the data provided in cloned session 120 is generated for purposes of the clone and is not the real data the malicious user is seeking. In some examples, if the malicious user has already accessed some data in a previous application session (e.g., before being detected), then that data is included in cloned session 120 so the malicious user will not realize the session is cloned but the remaining data is fabricated. The cloned session 120 can also be called a "honeypot."

If proxy 108 determines that identifier 118 does not match any of the identifiers in the group of malicious identifiers, then application session 122 is established. In some examples, when identifier 118 is determined not to be malicious but an identifier in the malicious group is associated with credential 116 (indicating that a user with a different identifier performed a malicious action during a session established with credential 116), it is determined that credential 116 is compromised. A user associated with credential 116 can then be notified (e.g., by email, SMS, in-application alert, or other communication) that credential 116 has been compromised. In some examples in which identifier 118 does not indicate a malicious user but credential 116 is also associated with a different identifier that is malicious, the application session request is denied, which can serve as a prompt for an authorized user to reset credentials. The malicious attacker, however, continues to be directed to cloned session 120 based on the detection of the malicious attacker's identifier.

The identifiers in the group of malicious identifiers can be populated as malicious activity is detected. For example, for an application session established with identifier A and credential B, if malicious activity is detected, the session is transferred to a cloned session and identifier A, and in some examples credential B, are added to the group of malicious identifiers. Future attempts to establish a session using identifier A will cause a cloned session to be established, and future attempts to establish a session using credential B can be handled differently from a typical non-malicious request even when the attempt is not associated with identifier A because credential B is likely compromised. Such attempts can result in, for example, denying the session request.

Out-of-date credentials can also be added to the group of malicious identifiers. For example, when identifier A and credential B are used to establish a session and malicious activity is detected, identifier A is added to the group of malicious identifiers. An authorized user associated with credential B then receives a message that her credentials have been compromised and, as a result, resets her credentials to credential C. At this point, it can be assumed that future use of credential B indicates that someone other than the authorized user (e.g., someone who purchased or found credential B on the dark web or through other means) is attempting to establish an application session and that the person is possibly malicious. A cloned session can then be established for session requests using credential B. In some examples, out-of-date credentials are added to the group of malicious identifiers after an amount of time (e.g., one day, one week, one month, etc.) has passed to allow for the possibility that the authorized user forgot that credential B had recently been changed to credential C.

Figure 2:
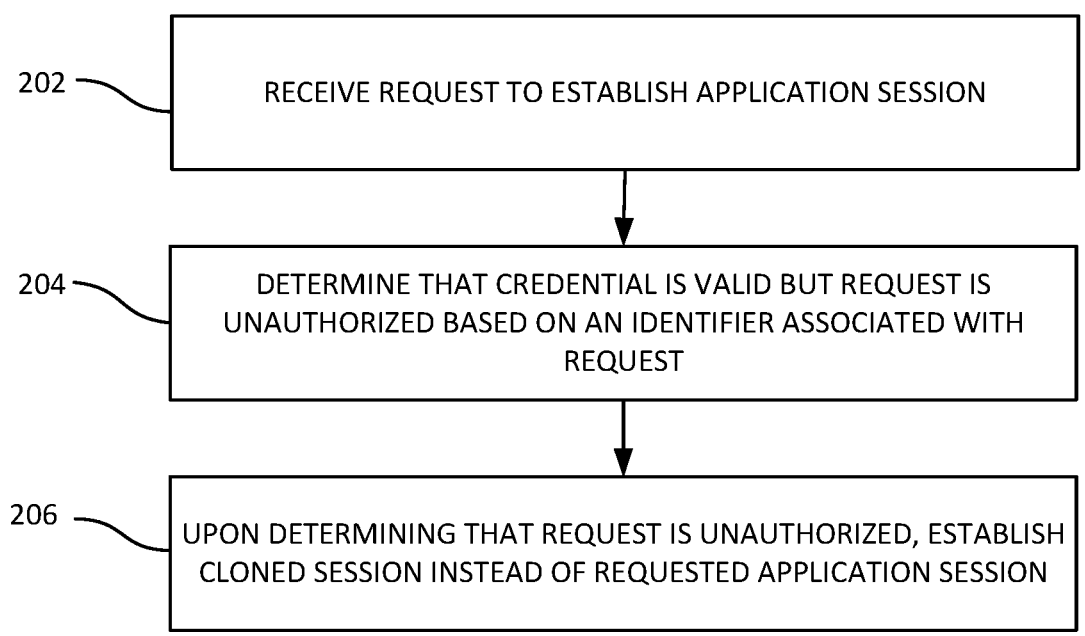
FIG. 2 illustrates an example method of securing an application in which an application session request includes a valid credential but is determined to be unauthorized based on an identifier associated with the request.

FIG. 2 illustrates a method 200 for securing an application. Method 200 can be performed by a system such as system 100 of FIG. 1. In process block 202, a request to establish a session with an application is received. The application can be, for example, a web application, and the request can be received from a web browser. The request includes at least one credential for establishing the session.

In process block 204, it is determined that the at least one credential is valid but that the request is an unauthorized request based on an identifier associated with the request. The identifier can be, for example, a digital fingerprint. In process block 206, upon determining that the request is an unauthorized request, a cloned application session is established instead of the requested session with the application, the cloned application session including at least some alternative data in place of data associated with an application account.

Figure 3:
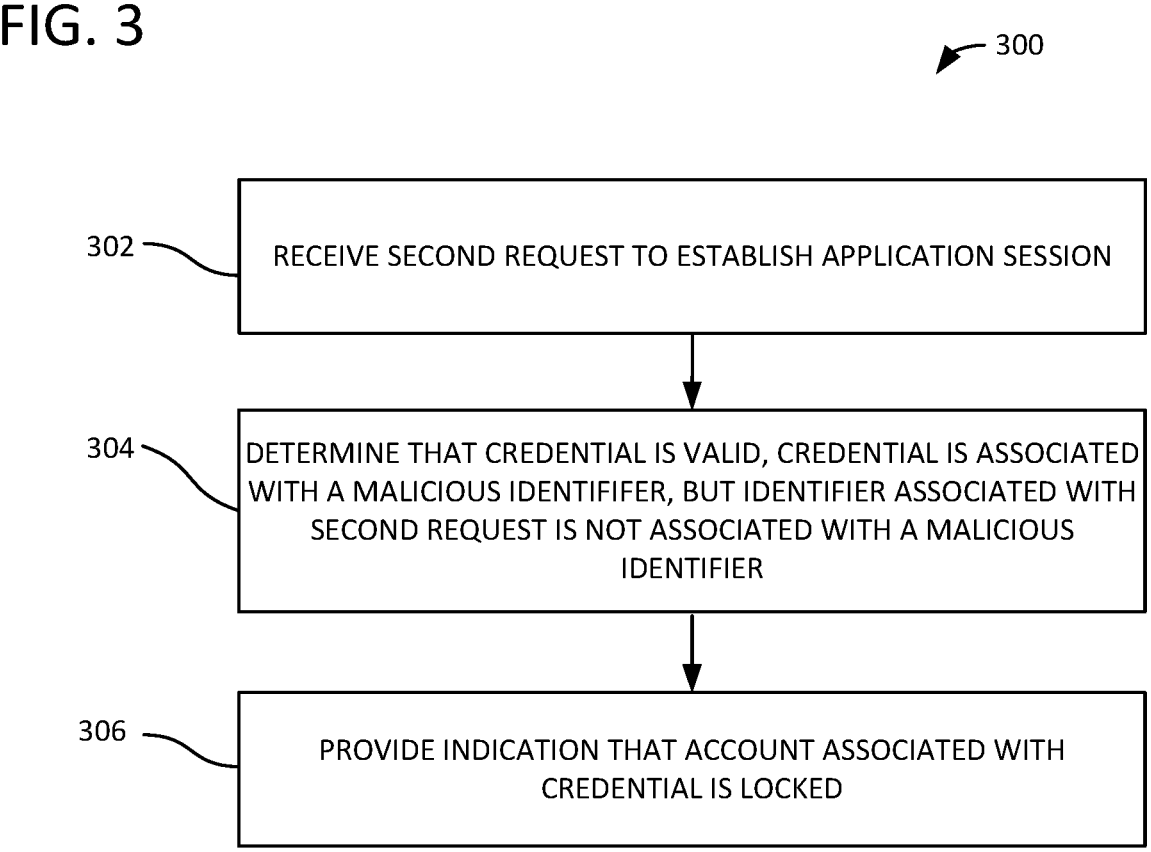
FIG. 3 illustrates an example method of securing an application in which an account locked indication is provided when an application session is requested using a credential that is associated with a malicious identifier but the request itself is not associated with a malicious identifier.

FIG. 3 illustrates a method 300 of securing an application. Method 300 can follow method 200 of FIG. 2 and can be performed by a system such as system 100 of FIG. 1. In process block 302, a second request to establish a second session with the application is received. The second request includes the at least one credential of method 200. In process block 304, it is determined that the at least one credential is valid. It is also determined in process block 304 that the at least one credential is associated with at least one malicious identifier of the group of malicious identifiers and that an identifier associated with the second request is not associated with the respective malicious identifiers in the group of malicious identifiers. In process block 306, an indication is provided that an account associated with the at least one credential is locked. Thus, in method 300, it was determined that the credential is or could be compromised, but the identifier associated with the second request was not malicious, so rather than establish a clone session, an "account locked" message is provided.

Figure 4:
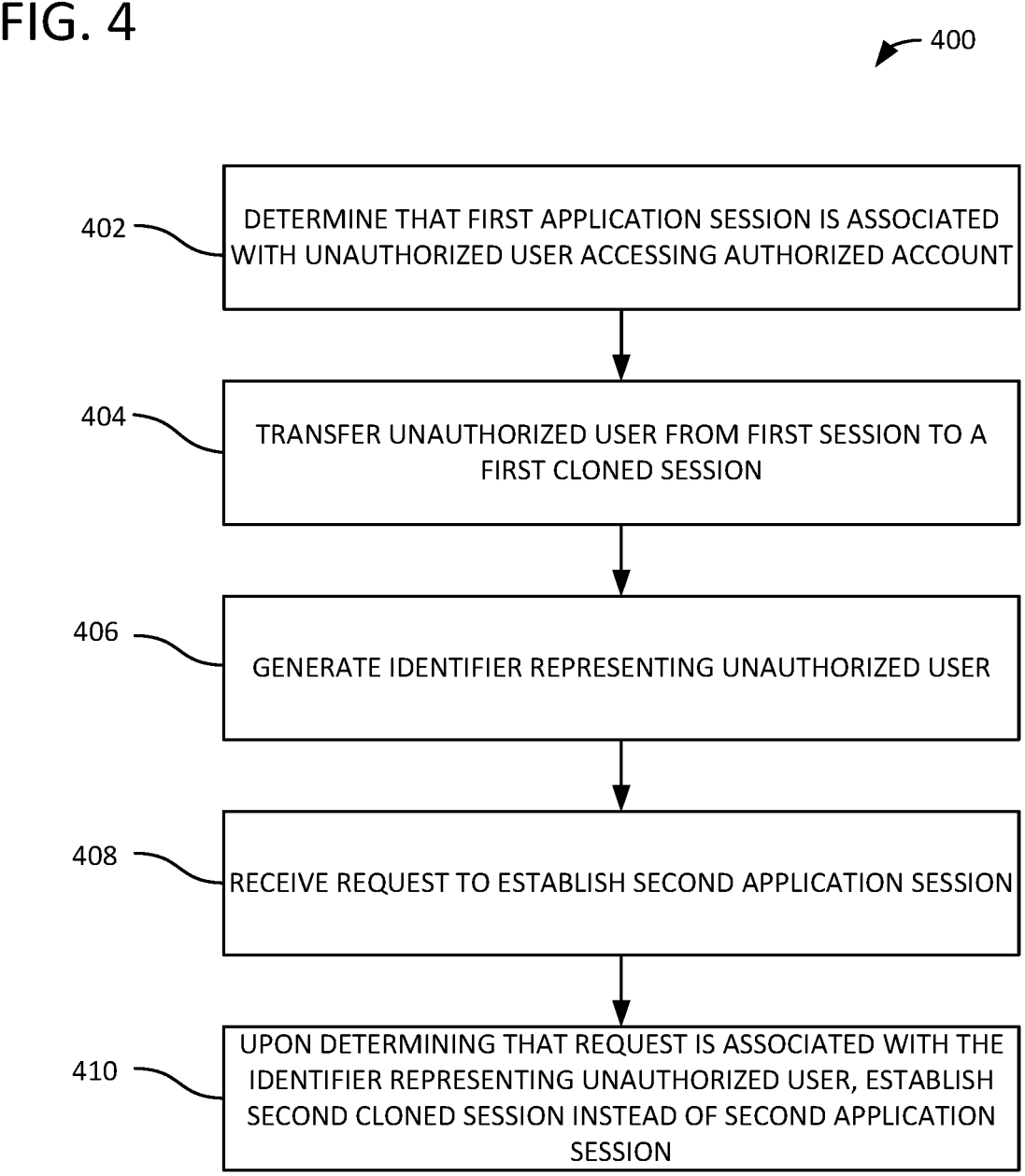
FIG. 4 illustrates an example method of securing an application in which an unauthorized user is transferred to a cloned session and in which a subsequent attempt to establish an application session by the unauthorized user causes another cloned session to be established.

FIG. 4 illustrates a method 400 of securing an application. Method 400 can be performed, for example, by system 100 of FIG. 1. In process block 402, it is determined that a first session with the application is associated with an unauthorized user accessing an account. This determination can be made based on actions taken during the first session, such as the user looking for hidden functions, attempting to modify a session cookie to become an administrator, or taking other actions that are unusual for a typical user. Other example actions include a user triggering a '403 unauthorized' error message and a user reading a database record which should not have been read (e.g., a table defined in the database as a table that should never be called, and the application logs that this table has been queried). The unauthorized user is transferred from the first session to a first cloned session of the application in process block 404. The first cloned session includes at least some alternative data in place of data associated with the authorized account. In some examples, if the unauthorized user has already accessed data prior to the determination that the user is unauthorized, the previously accessed data can be included in the first cloned session to avoid notifying the unauthorized user that he or she has been discovered.

In process block 406, an identifier is generated representing the unauthorized user. The identifier can be, for example, a digital fingerprint reflecting characteristics of the unauthorized user or a computing device from which the unauthorized user established the first session with the application. In some examples, the identifier representing the unauthorized user is generated after or as the first session is established and before it is determined that the first session is associated with the unauthorized user accessing the account. In other examples, the identifier is generated when it is determined that the first application session is associated with the unauthorized user.

In process block 408, a request to establish a second session with the application is received. Upon determining that the request to establish the second session is associated with the identifier representing the unauthorized user, a second cloned session is established in process block 410 instead of the second session with the application. Thus, in process block 408, the unauthorized user has tried to establish an application session again, but because the identifier informs the system (e.g., proxy 108 of FIG. 1) that the user is unauthorized, the second cloned session is established instead of a regular application session.

In some examples, method 400 also includes receiving a request to establish a third session with the application. Upon determining that the request to establish the third session is not associated with the identifier representing the unauthorized user, an indication is provided that the account is locked. Here, the request for the third application session came from a different user or machine than the unauthorized user, so a cloned session is not established and an account locked indication is provided instead. If an authorized user made the request, the account locked indication can inform the user that the user's credential is compromised and prompt the user to reset the credential. In some examples, an application session is established instead of providing the account locked indication. In some examples, a notification, such as a text message, email, SMS message, or in-application notification is generated for an authorized user of the account indicating that the account is locked.

Method 400 can also include upon determining that a login credential used to establish the first session associated with the unauthorized user, and which is also associated with the account, has been changed to a new credential (e.g., in response to an account locked indication), adding the login credential to a group of malicious indicators that trigger creation of cloned sessions rather than application sessions. The group of indicators includes the identifier representing the unauthorized user.

Figure 5:
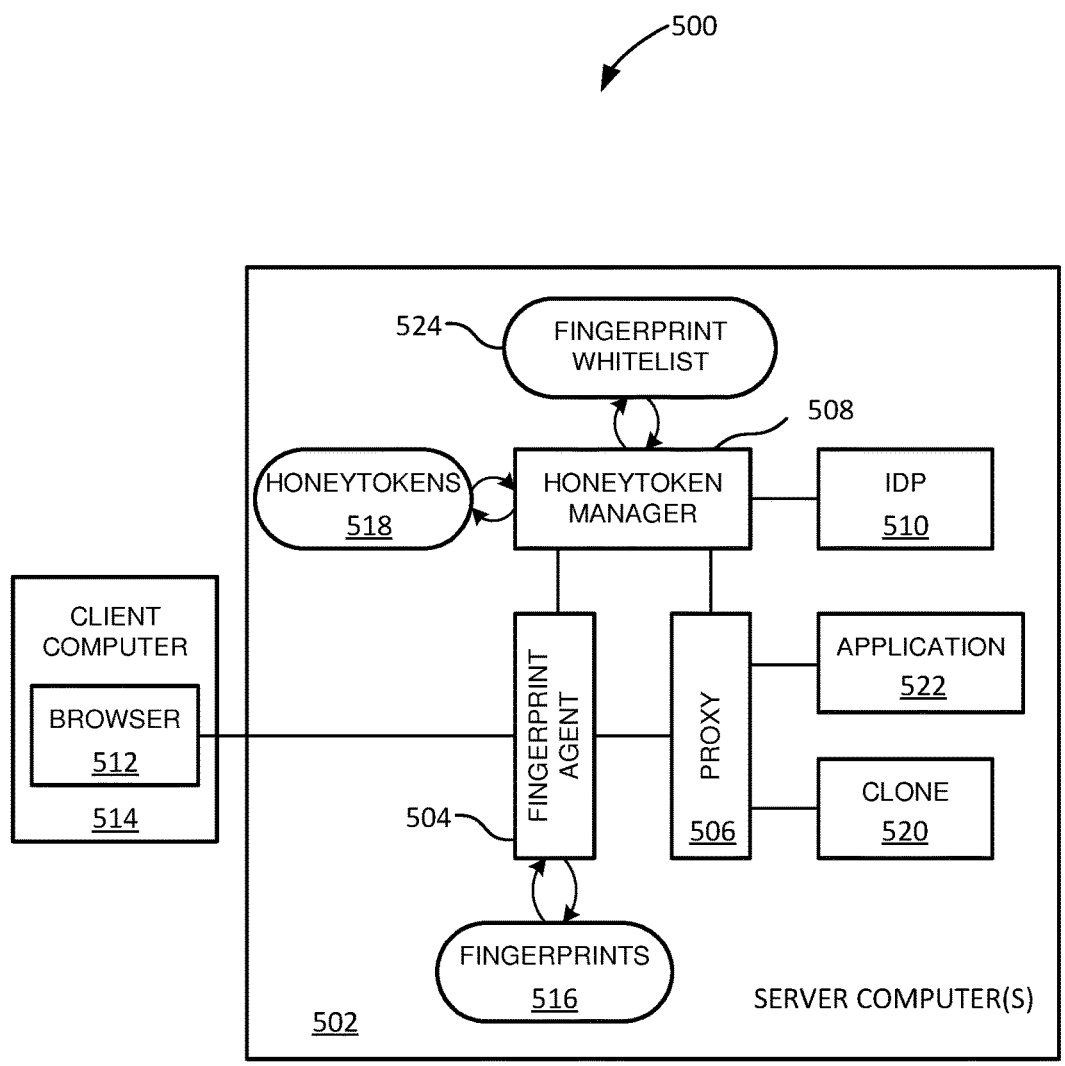
FIG. 5 is an example identifier-based application security system including a fingerprint agent.

FIG. 5 illustrates an identifier-based application security system 500 implemented on one or more server computer(s) 502. In system 500, functionality similar to proxy 108 of FIG. 1 is distributed among different components, including fingerprint agent 504, proxy 506, honeytoken manager 508, and IDP (identity provider module) 510. In a web application example, a user submits a request to establish an application session through browser 512 running on client computer 514. The request can include one or more credentials, and IDP 510 authenticates the user based on the credentials. Fingerprint agent 504 determines a digital fingerprint for the user (e.g., for browser 512 and/or client computer 514). The fingerprint is stored in fingerprint storage 516. The fingerprint can be stored along with the username associated with the session request and/or a session cookie identifying the session request. Fingerprint agent 504 can determine the fingerprint during an application session, before the session is established, or as the session is established. In some examples, the fingerprint is provided with the application session request by browser 512.

Honeytoken manager 508 accesses honeytoken storage 518 and determines whether any honeytokens have been triggered or are present in the request. "Honeytokens" are also known as, for example, deceptive elements, detection points, bread crumbs, canaries, or canary tokens. Honeytokens can be files, folders, URLs, options, usernames/passwords (e.g., admin/admin) or other items that inform honeytoken manager 508 when they are accessed or interacted with. Old passwords that were previously used to access an account in an unauthorized manner can also be added to honeytoken storage 518.

Honeytoken manager 508 communicates with proxy 506, both before a session is established and after a session has become established, as to whether there is a honeytoken match indicating a malicious session. If it is determined that the session is malicious based on a honeytoken match, proxy 506 directs the application session request to application clone 520. If a honeytoken is triggered during an established application session, a cloned session is generated, the session is identified as malicious, and the session is transferred to the cloned session.

If the session is determined to be non-malicious, proxy 506 directs the session request to application 522 and an application session is established. In some examples, honeytoken manager 508 maintains a fingerprint whitelist 524 of digital fingerprints (or other identifiers) that indicate malicious sessions/unauthorized users and that cause cloned sessions to be established rather than application sessions. A typical "whitelist" is a list of things that are granted permission, but the term is used here to describe fingerprints that are sent to a cloned session rather than application sessions. Honeytoken manager 508 compares the digital fingerprint associated with an application session request with digital fingerprints in fingerprint whitelist 524, and if the fingerprint associated with the request matches any of the fingerprints in fingerprint whitelist 524, the request is determined to be malicious and a session is established with clone 520 rather than application 522. In some examples, when a user has reset their password, the old password is added to honeytoken storage 518, and the fingerprint associated with the malicious activity that caused the authorized user to reset their password is removed from fingerprint whitelist 524. Once the old password is added as a honeytoken, any attempt to use the old password will result in the session request being identified as malicious. In some examples, the fingerprint is not removed from fingerprint whitelist 524 to account for the possibility that the attacker could try to gain access again using different account credentials.

In some examples, the determination of whether a session is malicious is performed prior to authentication by IDP 510. In such examples, if the fingerprint is determined to be non-malicious but a credential presented for authentication is determined to have been associated with a malicious session with a different fingerprint, the application session request can be denied or an account locked indication can be provided because the credential is compromised. IDP 510 can be an authentication service with which server computer(s) 502 communicate. In some examples, fingerprint agent 504 and honeytoken manager 508 are part of proxy 506.

Figure 6:
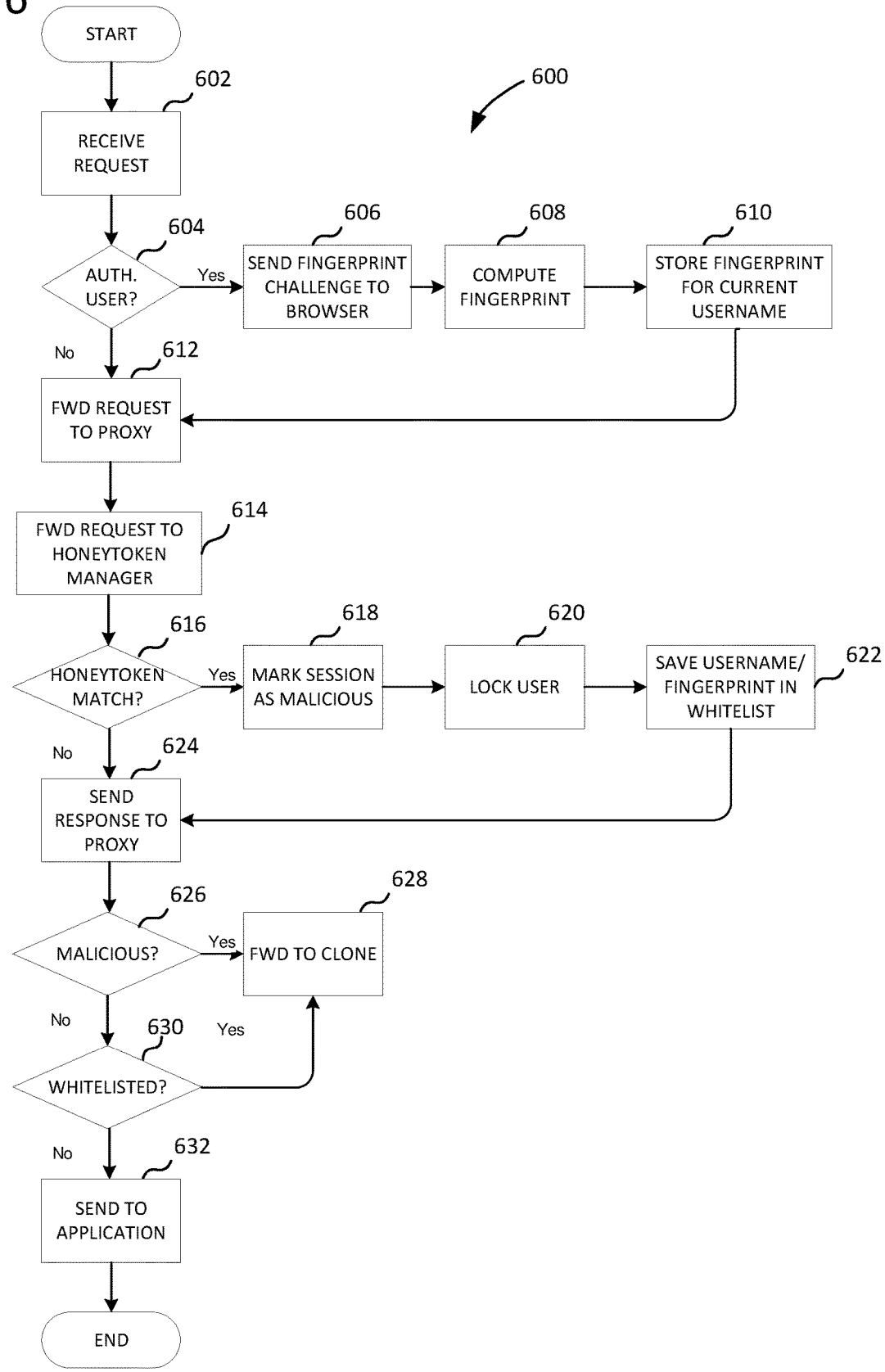
FIG. 6 illustrates an example method of using the example system of FIG. 5.

FIG. 6 illustrates a method 600 for securing an application. The process blocks of method 600 are described with reference to the system components of system 500 of FIG. 5 for explanatory purposes, but method 600 can be implemented with other systems as well (e.g., system 100 of FIG. 1).

In process block 602, a request to establish an application session is received (e.g., received by fingerprint agent 504 from web browser 512 running on client computer 514). In decision box 604, it is determined whether the user is an authorized user. This can be determined, for example, by communicating with IDP 510. If the user is an authenticated user, a fingerprint challenge is sent to the requesting browser in process block 606, and a fingerprint is then computed in process block 608. The fingerprint challenge can be sent, for example, from fingerprint agent 504 to browser 512, and the fingerprint can be computed by fingerprint agent 504 and/or browser 512. The computed fingerprint is stored (e.g., in fingerprint storage 516) with the associated username in process block 610. The request is then forwarded to the proxy (e.g., proxy 506) in process block 612. Returning to decision box 604, if the user is not authenticated, the request is forwarded to the proxy.

The request is forwarded to the honeytoken manager (e.g., honeytoken manager 508) in process block 614. In some examples the honeytoken manager is implemented as part of the proxy. In decision box 616, the honeytoken manager determines if there is a honeytoken match. For example, if an attacker had previously established a malicious session using an account login and password, and the session was flagged as malicious causing an authorized user to reset the account password, the old account password can be added as a honeytoken in honeytoken storage 518. Other honeytokens that can be triggered in the request include attempting to log in as an administrator or access particular sites or functionality. If there is a honeytoken match, the request is identified as malicious in process block 618. The account associated with the request is locked in process block 620, and the fingerprint and username associated with the request are saved in the fingerprint whitelist (e.g., fingerprint white list 524) so that if future session requests with same fingerprint are received, the requests will result in a cloned session rather than an application session. A response is sent to the proxy in process block 624. Returning to decision box 616, if there is not a honeytoken match, a response is sent to the proxy.

In decision block 626, the proxy (e.g., proxy 506) determines if the session request is malicious (as informed by honeytoken manager 508). If the request is malicious, the request is forwarded to the clone in process block 628 (e.g., application clone 520), and if not, it is determined in decision block 630 if the digital fingerprint associated with the request is whitelisted, which indicates a user associated with that fingerprint has previously engaged in malicious activity in an application session. Honeytoken manager 508 or proxy 506 can access fingerprint whitelist 524 to compare the fingerprint associated with the request with stored fingerprints. If the fingerprint matches a fingerprint stored in fingerprint whitelist 524, then the request is forwarded to the clone in process block 628 and a cloned session is established. If the fingerprint is not whitelisted, then the request is forwarded to the application (e.g., application 522) in process block 632.

A series of detailed examples illustrating the operation of system 500 will now be discussed. In these examples, "Bob" is an authorized user of an account, and "Alice" and "Charles" are unauthorized users who have obtained Bob's credentials. Fingerprint whitelist 524 is also initially empty. Bob opens web browser 512 on client computer 514 and requests the home page "GET/". Bob is not yet authenticated, and therefore has not established a session, but a session cookie is assigned and stored. At this point, server computer(s) 502 have the following information:

Session cookie: 793847892345
Username: (empty)
Fingerprint: (empty)

Bob is not authenticated at this point, so the request "GET/" is forwarded to proxy 506. Proxy 506 forwards the request to honeytoken manager 508. There is no honeytoken match as "/" is not a URL which is stored in honeytoken storage 518. Proxy 506 therefore receives the response from honeytoken manager 508 that the request is not malicious, and the session is not marked as malicious. At this point, there are no fingerprints in fingerprint whitelist 524 and a fingerprint has not yet been determined for Bob. The request is then sent to application 522, and Bob sees the home page appear in browser 512.

Bob then logs in, entering valid credentials on the login page "POST/login username=bob&password=ABC123". Bob is authenticated by IDP 510. At this point, server computer(s) 502 have the following information:
 Session cookie: 793847892345
 Username: Bob
 Fingerprint: (empty)

Bob is now authenticated and fingerprint agent 504 communicates with browser 512 and/or client computer 514 to generate a digital fingerprint for Bob. At this point, server computer(s) 502 have the following information:
 Session cookie: 793847892345
 Username: Bob
 Fingerprint: a453bb345db56a3e The URL "/login" is not in honeytoken storage 518, nor are the credentials of Bob, so application 522 shows Bob's profile page.

At this point, Bob logs out. Alice, who has stolen or otherwise obtained Bob's credentials, goes to the home page "GET/" from a different computing device. Alice is not yet authenticated, but she is assigned a new session cookie. At this point, server computer(s) 502 have the following information:
 Session cookie: 55556745
 Username: (empty)
 Fingerprint: (empty)

Alice now attempts to see if there is an admin panel. She requests the page "GET/admin". Alice is still unauthenticated, and the request is forwarded to proxy 506, which forwards the request to honeytoken manager 508. Because "/admin" was defined as a honeytoken in honeytoken storage 518, the request (having session cookie 55556745) is marked as malicious. In this case, because Alice was not authenticated and did not provide Bob's credentials, a fingerprint was not determined and Bob's account was not locked. However, because Alice triggered a honeytoken, a cloned session was established and Alice is transferred to clone 520.

From now on, Alice remains in the cloned session as long as she does not delete her session cookie or start a new session from scratch. While in the cloned session, if Alice enters Bob's credentials, clone 520 can communicate with IDP 510 to determine if the credentials are valid, and if so, Bob's account can be locked while Alice remains in the cloned session and is not shown any data associated with Bob's account.

Charles also has also a copy of Bob's credentials. Charles goes to "GET/" and a session cookie is generated for the request. At this point, server computer(s) 502 have the following information:
 Session cookie: 12143123
 Username: (empty)
 Fingerprint: (empty)

Charles logs in as Bob "POST/login username=bob&password=ABC123". Upon login, a fingerprint is generated corresponding to Charles (and Charles' computer) and is stored in fingerprint storage 516. At this point, server computer(s) 502 have the following information:
 Session cookie: 55556745
 Username: Bob
 Fingerprint: dd234e5467fa678e Charles then tries to go to an admin page "GET/admin". This triggers a honeytoken because "/admin" is stored in honeytoken storage 518, so the session (session cookie 12143123) is marked as malicious and Bob's account is locked. Charles' fingerprint (dd234e5467fa678e) in stored in fingerprint whitelist 524. Because the session is malicious, a cloned session is generated and Charles is transferred to the cloned session. Charles closes his browser and does not log in for several days.

Later, Charles attempts to log in again. Because this is a new session, when Charles asks for the home page, a new session cookie is generated. Charles goes to "GET/", and server computer(s) 502 have the following information:
 Session cookie: 47754224
 Username: (empty)
 Fingerprint: (empty)

Charles logs in again as Bob, "POST/login username=bob&password=ABC123". Upon login, a fingerprint is determined by fingerprint agent 504 interacting with Charles' browser and computer. Charles is logging in with the same computer he used previously, so his fingerprint is again determined to be "dd234e5467fa678e." At this point, server computer(s) 502 have the following information:
 Session cookie: 47754224
 Username: Bob
 Fingerprint: dd234e5467fa678e The request is sent to proxy 506, which forwards the request to honeytoken manager 508. There is no honeytoken match, so the request is sent back to proxy 506. The session is not yet determined to be malicious until it is determined that Charles' fingerprint is stored in fingerprint whitelist 524. A cloned session is then generated and Charles is sent to the clone.

The authorized user, Bob, then returns and goes to "GET/" and attempts to establish a session, resulting in a new session cookie. At this point, server computer(s) 502 have the following information:
 Session cookie: 99595334
 Username: (empty)
 Fingerprint: (empty)

Bob logs in as himself, "POST/login username=bob&password=ABC123". Upon login, a fingerprint is computed, which is the same as before because Bob is again logging in from browser 512 of client computer 514. At this point, server computer(s) 502 have the following information:
 Session cookie: 99595334
 Username: Bob
 Fingerprint: a453bb345db56a3e The request does not match a honeytoken, and the fingerprint is not in the whitelist, so the session is determined to not be malicious. The request goes to the application 522, but because Bob's credentials had been previously used for malicious activity by Charles, a message is provided to browser 512 that Bob's account is locked.

Bob then resets his password. Bob's old credentials are added to honeytoken storage 518 as honeytokens, and, in some examples, fingerprint whitelist 524 is cleared.

At some point after Bob resets his password, Alice comes back and goes to "GET/". Server computer(s) 502 have the following information:
 Session cookie: 00234234
 Username: (empty)
 Fingerprint: (empty)

Alice logs in as Bob using Bob's old password, "POST/login username=bob&password=ABC123." Because this is an attempt at authentication, a fingerprint is generated and stored in fingerprint storage 516. Server computer(s) 502 has the following information:

Session cookie: 00234234
Username: Bob
Fingerprint: e34f3f88e65fc8aad

The request is sent to proxy 506 and then to honeytoken manager 508. Honeytoken manager 508 recognizes that Bob's old password, "bob/ABC123" is a honeytoken, and the session is marked as malicious. Because Bob has already changed his password, the use of Bob's old credentials does not lock Bob's account. Whether Bob's account is locked can be made contingent on authentication being successful (i.e., if authentication is not successful because the password is old, Bob's account is not locked). Such an approach is illustrated by server computer(s) 502 storing the following:

Session cookie: 00234234
Username: Bob
Fingerprint: e34f3f88e65fc8aad
Successful_authentication: false Alice's fingerprint is stored in fingerprint whitelist 524 in case she comes back, and because her session is malicious, a cloned session is generated and she is transferred to the cloned session.

Figure 7:
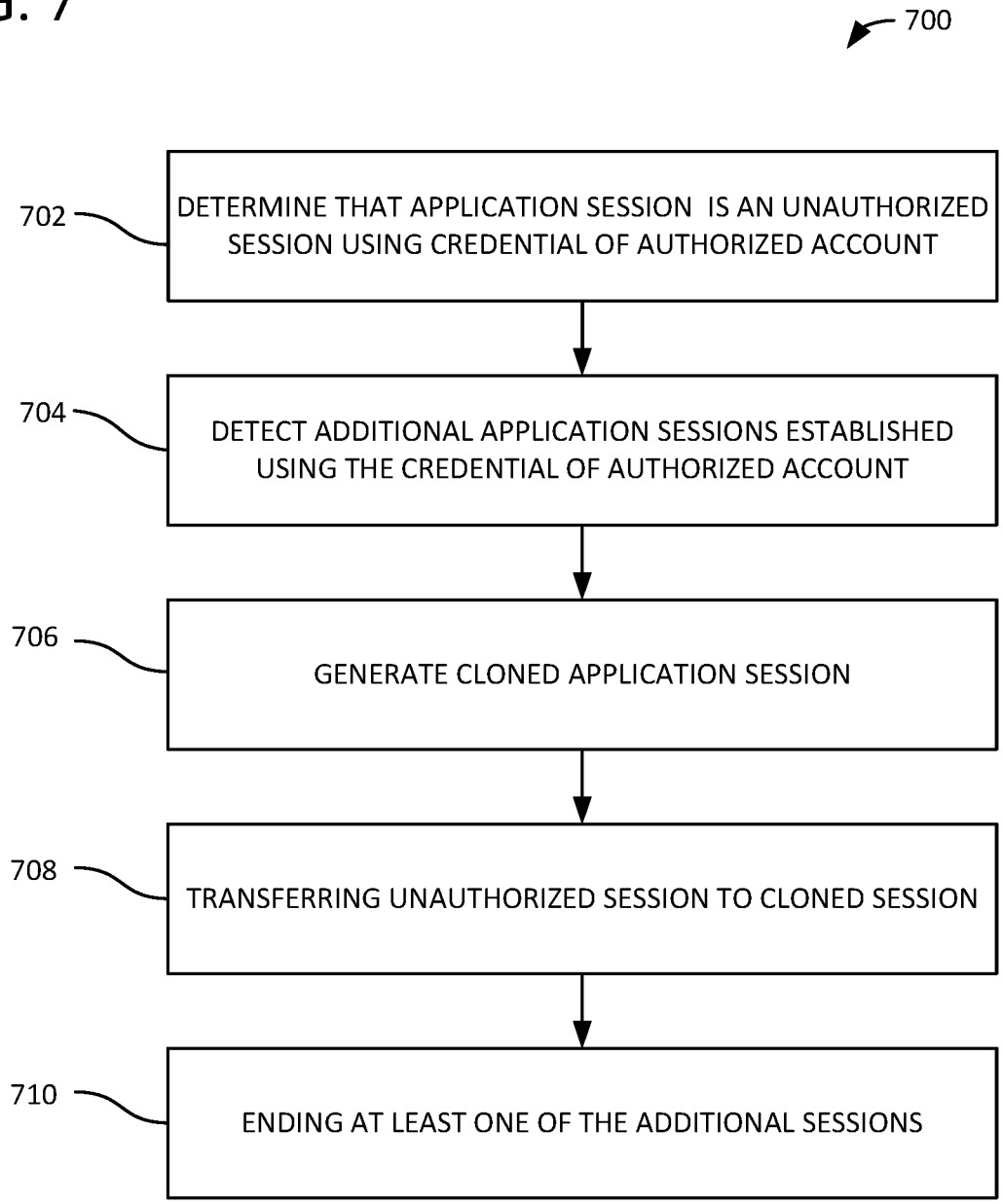
FIG. 7 illustrates an example method of securing an application in which multiple application sessions have been established using a credential.

FIG. 7 illustrates a method 700 of securing an application in which multiple application sessions have been established using a credential. In process block 702, it is determined that a session with the application is an unauthorized session established using a credential of an authorized account. In process block 704, a plurality of additional sessions with the application are detected. The plurality of additional sessions are established using the credential of the authorized account. In process block 706, a cloned session of the application is generated. The cloned session includes at least some alternative data in place of data associated with the authorized account. The unauthorized session is transferred to the cloned session in process block 708. In process block 710, at least one of the plurality of additional sessions is ended.

In method 700, there are multiple sessions that have been established using the same credential, and one of those sessions is determined to be unauthorized and is transferred to a cloned session. In some examples, all the remaining sessions are ended. It may be, however, that more than one of the multiple sessions were established by the same attacker. Thus, even though the cloned session is established to avoid alerting the attacker, the attacker would still realize she has been detected because another of the attacker's sessions was terminated. To account for this possibility, in some examples, the at least one of the plurality of additional sessions that was ended is a session determined to be most likely, of the plurality of additional sessions, to be an authorized session. For the remaining additional sessions, additional cloned sessions can be generated, and the remaining additional sessions can be transferred to the additional cloned sessions.

The determination of being most likely to be an authorized session can be made based on a reputation score for respective identifiers (e.g., digital fingerprints) associated with the plurality of additional sessions. The reputation score can reflect application use details, application use frequency, or other factors. As an example, each time a new digital fingerprint is created, a neutral reputation score (e.g., 0) can be assigned. The score can be adjusted upward (e.g., +1, +0.5, +10, etc.) when application activity associated with the fingerprint is typical and does not indicate malicious activity. The score can similarly be adjusted upward each time an application session is established with the fingerprint (the high frequency of sessions without malicious activity can indicate that the user is non-malicious). The reputation score can be adjusted downward due to infrequent application use, application activity that is atypical but does not appear to indicate malicious activity, for logins from unfamiliar IP addresses, times, or browsers, or for other reasons.

Figure 8:
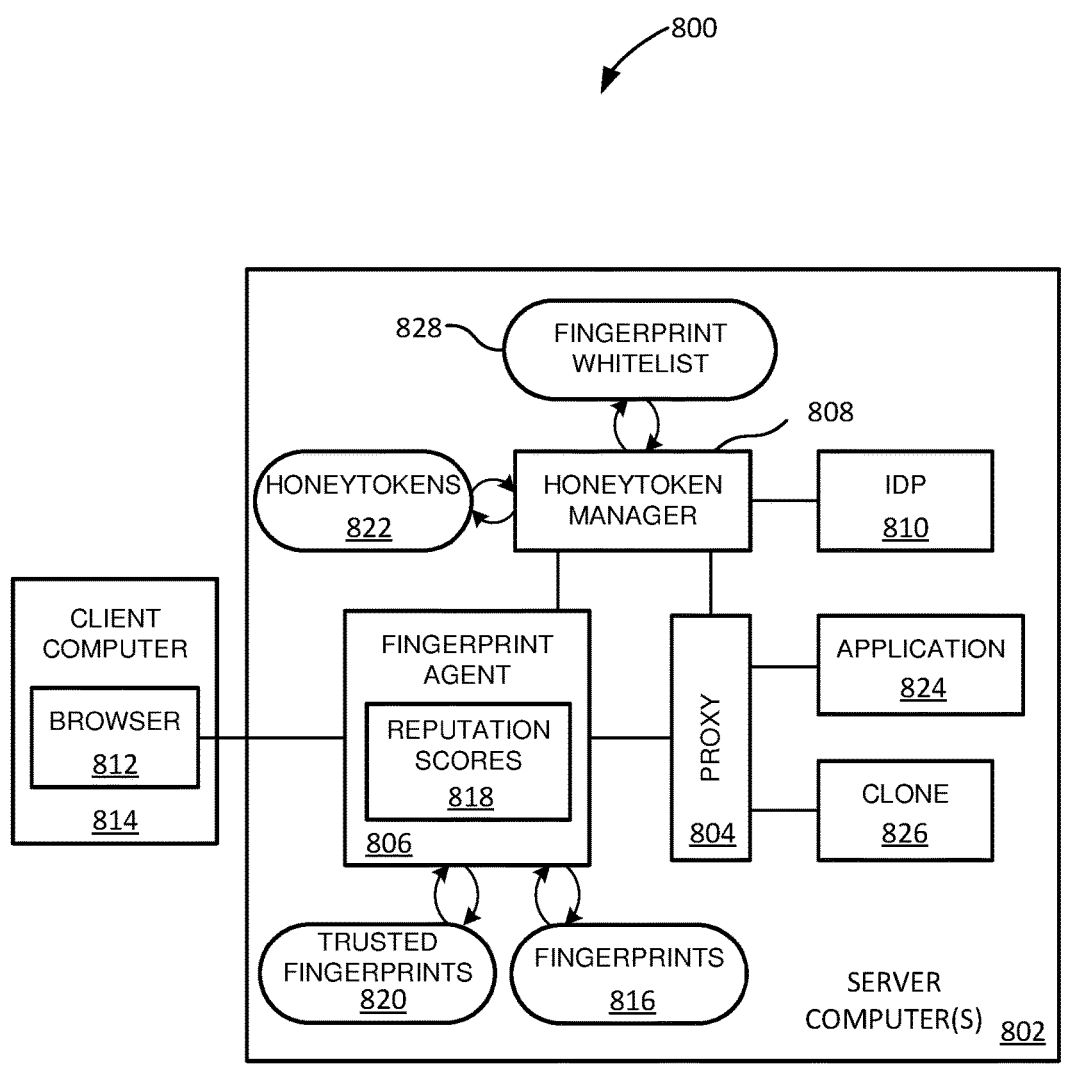
FIG. 8 illustrates an example identifier-based application security system in which the system determines a reputation score.

FIG. 8 illustrates an identifier-based application security system 800 implemented on one or more server computer(s) 802 in which a reputation score is determined for fingerprints. As with system 500 of FIG. 5, functionality similar to proxy 108 of FIG. 1 is distributed among different components, including proxy 804, fingerprint agent 806, honeytoken manager 808, and IDP (identity provider module) 810. In a web application example, a user submits a request to establish an application session through browser 812 running on client computer 814. The request can include one or more credentials, and IDP 810 authenticates the user based on the credentials.

Fingerprint agent 804 determines a digital fingerprint for the user (e.g., for browser 812 and/or client computer 814). The fingerprint is stored in fingerprint storage 816. The fingerprint can be stored along with the username associated with the session request. Fingerprint agent 804 can determine the fingerprint during an application session, before the session is established, or as the session is established. In some examples, the fingerprint is provided with the application session request by browser 812.

Fingerprint agent 804 determines a reputation score for the fingerprint and stores the score in reputation scores storage 818. In some examples, when a fingerprint is first established, fingerprint agent 806 assigns the fingerprint a neutral score. Various trends or activities (e.g., those discussed above with respect to FIG. 7) in a current session and future sessions can cause the score to be increased, and other activities or trends can cause the reputation score to be decreased. Fingerprints that have achieved a threshold reputation score can be stored in trusted fingerprint storage 820. The threshold can be a certain number of reputation points above neutral, be percentile-based, or be otherwise determined. In some examples trusted fingerprint storage 820 is omitted and the reputation scores of the fingerprints in fingerprint storage 816 are compared when needed. In some examples, all fingerprints that have not been found to be malicious are stored in trusted fingerprint storage 820.

Honeytoken manager 808 accesses honeytoken storage 822 and operates similarly to the corresponding system components in system 500 of FIG. 5. Proxy 804 operates similarly to proxy 506 of FIG. 5 and forwards application session requests to either application 824 or clone 826 depending on whether the request is determined to be malicious. Proxy 804 and/or honeytoken manager 808 can access fingerprint whitelist 828 to compare fingerprints of session requests with known malicious fingerprints. Reputation scores 818 can be used by fingerprint agent 806 and/or proxy 804 to determine how to handle multiple sessions open at the same time using the same credentials when one of those sessions is determined to be malicious. An example of such an approach is illustrated in FIG. 9

Figure 9:
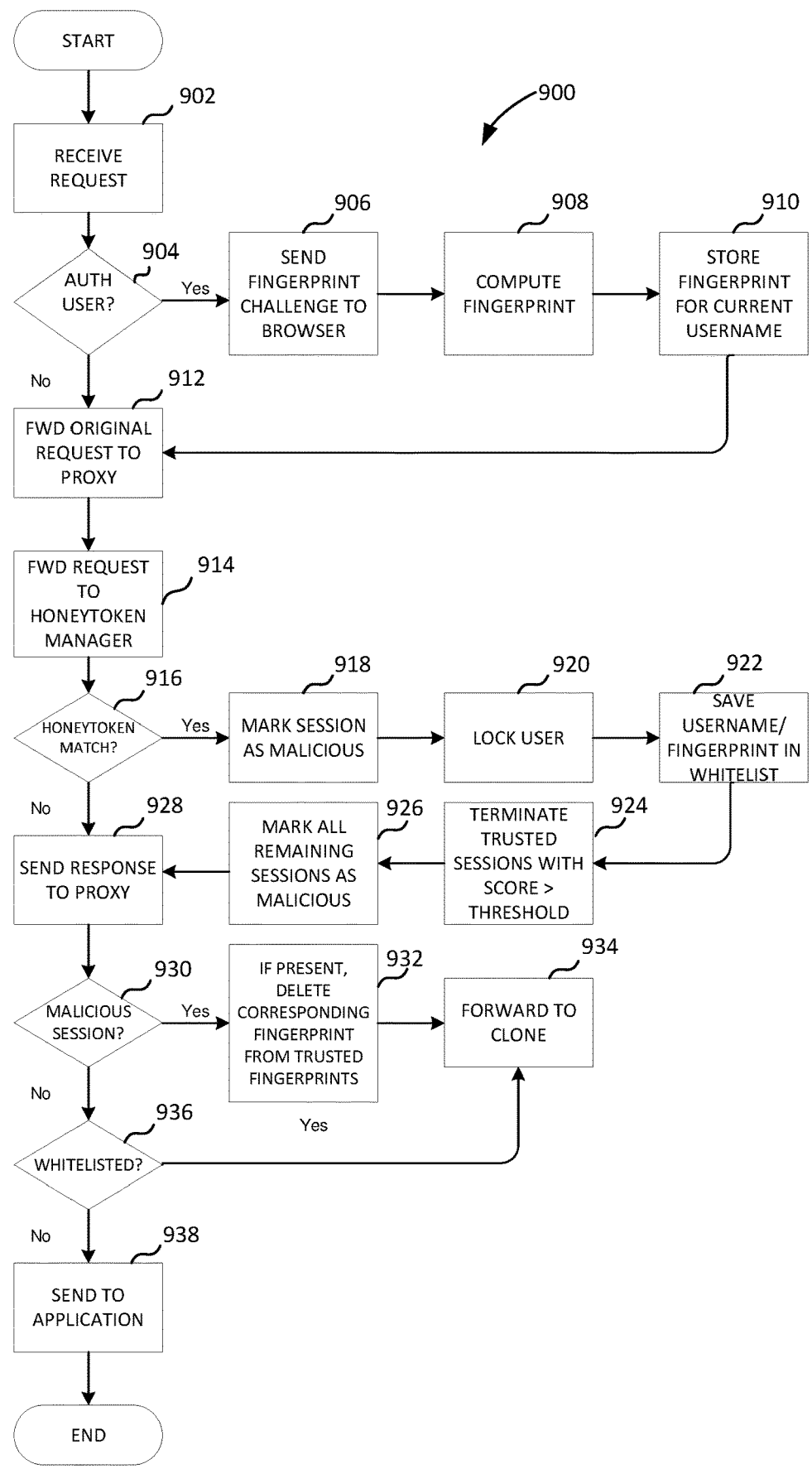
FIG. 9 illustrates an example method of using the example system of FIG. 8.

FIG. 9 shows an example method 900 for securing an application in which reputation scores are considered to handle detection of a malicious session request when multiple sessions are already running at the same time using the same credentials. A similar approach can be followed when a honeytoken is triggered in one of multiple sessions running at the same time. Some of the process blocks of method 900 are discussed with reference to system 800 for explanatory purposes, but method 900 can be implemented with other systems as well (e.g., system 100 of FIG. 1 and system 500 of FIG. 5). In process block 902, a request to establish an application session is received. Process and decision blocks 904 through 922 operate similarly to the corresponding process and decision blocks in method 600 of FIG. 6.

In process block 924, after the session request has been marked malicious in process block 918 because of a honeytoken match determined in decision box 916, and the fingerprint has been saved to the whitelist (e.g., fingerprint whitelist 828), sessions associated with trusted fingerprints having a reputation score above a threshold are terminated. Proxy 804, fingerprint agent 806, or other component of system 800 can access trusted fingerprint storage 820 and/or reputation scores 818 to make the determination about which sessions should be terminated.

Reputation scores and thresholds can be implemented in a number of ways. In some examples, a scale between, e.g., 0 and 100, 0 and 50, 0 and 10, etc. is used. Thresholds can be determined dynamically by analyzing the range of reputation scores and identifying a threshold that separates the scores into distinct groups. For example, if user A has a score of 48, user B has 47, user C has 12, and user D has 7, a threshold in the 40 s (e.g., 46, 45, 40) etc. treats users A and B similarly (e.g., terminating their sessions) due to their close scores and treats the significantly lower scores of users C and D differently (e.g., by sending them to a cloned session). Similarly, if scores for four users are 78, 45, 43, and 14, a threshold in the 70 s (e.g., 77, 75, 70, etc.) can be used to separate the significantly different scores of 78 and 45. As another example, for scores of 23, 22, 20, and 12, the threshold can be set between the group of three higher scores and the score of 12.

Typical users will likely have several devices from which they routinely connect (e.g., work machine/work browser, home machine/home browser, mobile device/mobile browser). For a typical user, reputation scores for each of these three connection modes will probably be similar but not the same; thus, in addition to determining a threshold between groupings of close scores, the threshold can be selected such that a maximum number of scores are above the threshold (e.g., one, two, or three) to take into account the user's different connection modes. In some examples, the threshold is computed system wide, and reputation scores can be compared and analyzed across users to determine the threshold.

In some examples, only the one, two, three, etc. sessions associated with the fingerprints having the highest reputation score of the multiple sessions are terminated. The higher the reputation score, the more likely the session is associated with an authorized user. Terminating the sessions associated with a high reputation score is therefore likely to alert the authorized user that her session has been compromised. If the session with the highest reputation score is the session request, then the request can be denied, one or more (or none) other highly-scored sessions can be terminated, and the remaining sessions can be marked as malicious.

In process block 926, remaining sessions of the multiple sessions that were not terminated are marked as malicious. The indication that these sessions are malicious is sent to the proxy (e.g., proxy 804) in process block 928. In decision block 930, if the proxy determines, based on the information provided in process block 928, that the session request is malicious then in process block 932, if the fingerprint associated with the malicious request was a trusted fingerprint, then the fingerprint is deleted from the trusted fingerprints (e.g., deleted from trusted fingerprint storage 820). The request is forwarded to the clone (e.g., clone 826) in process block 934. In decision box 936, it is determined if the fingerprint associated with the session request matches a fingerprint stored in fingerprint whitelist 828. If so, then the request is forwarded to the clone in process block 934 and a cloned session is established. If the fingerprint is not whitelisted, then the request is forwarded to the application (e.g., application 824) in process block 938.

Figure 10:
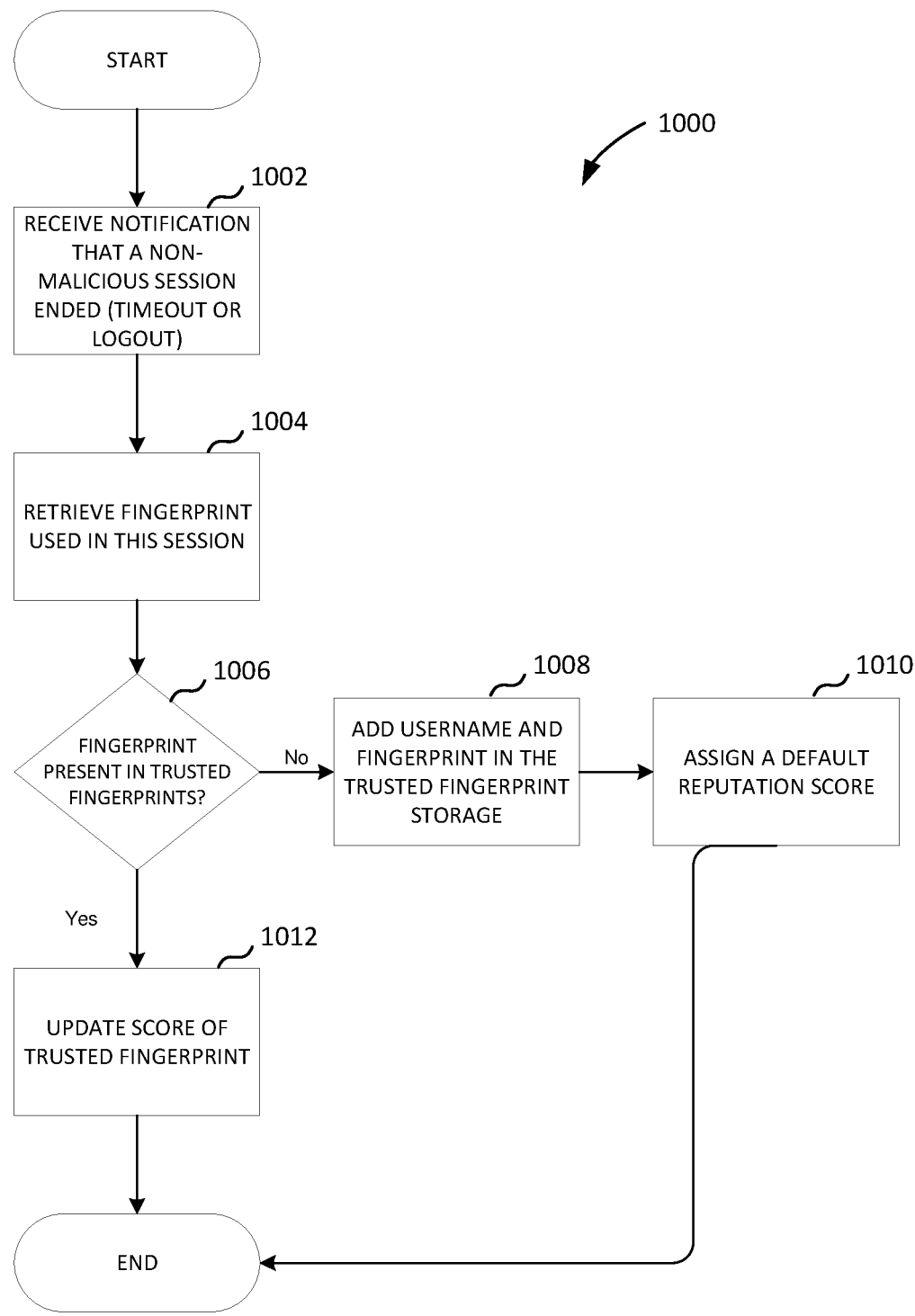
FIG. 10 illustrates an example method of determining a reputation score.

FIG. 10 illustrates a method 1000 of managing a fingerprint reputation score when a session has ended. Method 1000 can be implemented, for example, by fingerprint agent 806 of FIG. 8. In process block 1002, a notification is received that a non-malicious session has ended, either through timeout or logout. In process block 1004, the fingerprint associated with the session is retrieved. In decision block 1006, it is determined whether the fingerprint is present in the trusted fingerprint storage. If not, then the username and fingerprint are added to the trusted fingerprint storage in process block 1008 and assigned a default (e.g., neutral) reputation score in process block 1010. If the fingerprint is in the trusted fingerprint storage, then the score of the fingerprint is updated in process block 1012 reflecting the ended session. For example, if the session occurred at the usual time and typical operations were performed, the reputation score is increased.

In some examples, an attacker who has been transferred to a cloned session changes the password for the associated account in the clone. This new password, having been created in the cloned session, is not effective to change the account's actual password, but the new password can be added as a honeytoken so that anyone trying to use this new password is redirected to a cloned session. In some examples, the number of old passwords kept as honeytokens is limited (e.g., to one or two per account) to prevent the release of old passwords if the honeytoken storage were hacked or leaked.

Example Computing Systems

Figure 11:
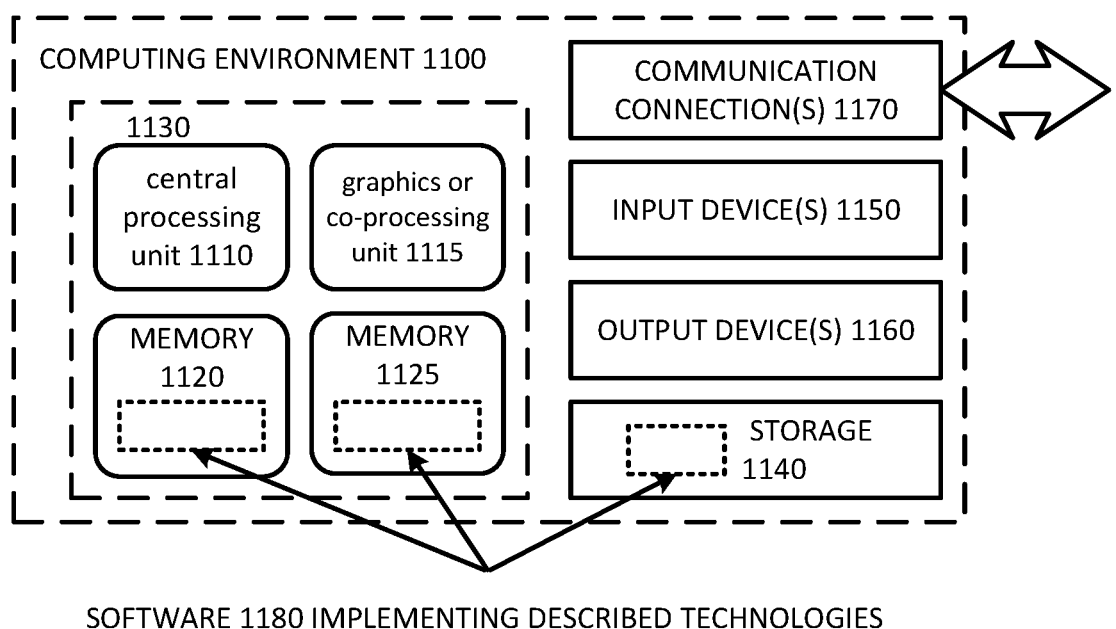
FIG. 11 is a diagram illustrating a generalized implementation environment in which some described examples can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, memory 1120 and 1125 can store proxy 108 of FIG. 1 and the various components of FIGS. 5 and 8, including fingerprint agent 504, proxy 506, honeytoken manager 508, fingerprint agent 806, proxy 804, and honeytoken manager 808.

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180 implementing one or more innovations described herein. For example, storage 1140 can store proxy 108 of FIG. 1 and the various components of FIGS. 5 and 8, including fingerprint agent 504, proxy 506, honeytoken manager 508, fingerprint agent 806, proxy 804, and honeytoken manager 808.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A system, comprising:
   a processor;
   a memory coupled to the processor; and
   a proxy configured to:
   receive a request to establish a session with an application, the request including credentials for establishing the session;
   determine, by the processor, that the credentials are valid but that the request is nevertheless an unauthorized request based on a digital fingerprint associated with the request, wherein the digital fingerprint is generated during a different session with the application and reflects characteristics of at least one of a user associated with the unauthorized request or a computing device associated with the unauthorized request; and
   upon determining that the request is an unauthorized request, establish a cloned application session instead of the requested session with the application, the cloned application session including at least some alternative data in place of data associated with an application account.

2. The system of claim 1, wherein the digital fingerprint is one of a group of malicious identifiers for which cloned sessions are created rather than application sessions.

3. The system of claim 2, wherein the digital fingerprint is determined to be a malicious identifier of the group of malicious identifiers based on activity during a previous application session associated with the digital fingerprint.

4. The system of claim 2, wherein the request is a first request to establish a first session with the application, and wherein the proxy is further configured to, by the processor:
   receive a second request to establish a second session with the application, the second request including the credentials;
   determine, by the processor, that: the credentials are valid, the credentials are associated with at least one malicious identifier of the group of malicious identifiers, and that a digital fingerprint associated with the second request is not associated with the respective malicious identifiers in the group of malicious identifiers; and
   provide an indication that an account associated with the credentials is locked.

5. The system of claim 2, wherein the proxy is further configured to, by the processor:
   determine that at least one of the credentials has been changed to a new credential; and
   add the changed credential to the group of malicious identifiers.

6. The system of claim 1, wherein the application is a web application.

7. A method for securing an application, the method comprising:
   determining that a first session with the application is associated with an unauthorized user accessing an account;
   transferring the unauthorized user from the first session to a first cloned session of the application, wherein the first cloned session includes at least some alternative data in place of data associated with the account;
   generating an identifier representing the unauthorized user;
   receiving a request to establish a second session with the application; and
   upon determining that the request to establish the second session is associated with the identifier representing the unauthorized user, establishing a second cloned session instead of the second session with the application; and
   upon determining that a login credential associated with the account has been changed to a new credential, adding the login credential to a group of malicious identifiers that trigger creation of cloned sessions rather than application sessions, wherein the login credential was used to establish the first session associated with the unauthorized user.

8. The method of claim 7, further comprising:
   receiving a request to establish a third session with the application; and
   upon determining that the request to establish the third session is not associated with the identifier representing the unauthorized user, providing an indication that the account is locked.

9. The method of claim 7, further comprising generating a notification for an authorized user of the account that the account is locked.

10. The method of claim 7, wherein the group of malicious identifiers includes the identifier representing the unauthorized user.

11. The method of claim 7, wherein the identifier is a digital fingerprint reflecting characteristics of the unauthorized user or a computing device from which the unauthorized user established the first session with the application.

12. The method of claim 7, wherein the identifier representing the unauthorized user is generated after the first session is established and before it is determined that the first session is associated with the unauthorized user accessing the account.

13. The method of claim 7, wherein determining that the first session is associated with the unauthorized user accessing the account is based on actions performed during the first session.

14. One or more computer-readable storage media storing computer-executable instructions for performing application security operations, the operations comprising:
   receiving a request to establish a session with an application, the request including credentials for establishing the session;
   determining, that the credentials are valid but that the request is nevertheless an unauthorized request based on a digital fingerprint associated with the request, wherein the digital fingerprint is generated during a different session with the application and reflects characteristics of at least one of a user associated with the unauthorized request or a computing device associated with the unauthorized request; and upon determining that the request is an unauthorized request, establishing a cloned application session instead of the requested session with the application, the cloned application session including at least some alternative data in place of data associated with an application account.

15. The computer-readable storage media of claim 14, wherein the digital fingerprint is one of a group of malicious identifiers for which cloned sessions are created rather than application sessions.

16. The computer-readable storage media of claim 15, wherein the digital fingerprint is determined to be a malicious identifier of the group of malicious identifiers based on activity during a previous application session associated with the digital fingerprint.

17. The computer-readable storage media of claim 15, wherein the request is a first request to establish a first session with the application, and wherein the operations further comprise:

receiving a second request to establish a second session with the application, the second request including the credentials;

determining that: the credentials are valid, the credentials are associated with at least one malicious identifier of the group of malicious identifiers, and that a digital fingerprint associated with the second request is not associated with the respective malicious identifiers in the group of malicious identifiers; and providing an indication that an account associated with the credentials is locked.

18. The computer-readable storage media of claim 15, wherein the operations further comprise:

determining that at least one of the credentials has been changed to a new credential; and adding the changed credential to the group of malicious identifiers.

19. The computer-readable storage media of claim 14, wherein the application is a web application.

* * * * *